United States Patent [19]

Kishimoto

[11] Patent Number: 4,855,998
[45] Date of Patent: Aug. 8, 1989

[54] STAND-ALONE TRANSMISSION CONTROLLER

[75] Inventor: Kazuo Kishimoto, Hyogo, Japan

[73] Assignee: Mitsubishi Denki Kabushiki Kaisha, Tokyo, Japan

[21] Appl. No.: 933,155

[22] Filed: Nov. 21, 1986

[30] Foreign Application Priority Data

Jan. 20, 1986 [JP] Japan .................................. 61-9324

[51] Int. Cl.$^4$ ............................................. H04L 5/22
[52] U.S. Cl. ................................. 370/86; 340/825.05
[58] Field of Search ........................... 370/86, 89, 90; 340/825.05, 825.5, 85

[56] References Cited

U.S. PATENT DOCUMENTS

| Re. 31,852 | 3/1985 | Soderblom | 370/86 |
| 4,019,176 | 4/1977 | Cour et al. | 370/89 |
| 4,517,644 | 5/1985 | Hamada et al. | 370/86 |
| 4,583,089 | 4/1986 | Cope | 340/825.05 |
| 4,604,742 | 8/1986 | Hamada et al. | 370/89 |
| 4,677,614 | 6/1987 | Circo | 370/86 |

FOREIGN PATENT DOCUMENTS 0119003 9/1984 European Pat. Off. .
46-35931 10/1971 Japan .
2140180 11/1984 United Kingdom .

Primary Examiner—Douglas W. Olms
Assistant Examiner—Melvin Marcelo
Attorney, Agent, or Firm—Bernard, Rothwell & Brown

[57] ABSTRACT

Disclosed is a stand-alone transmission controller equipped in each of many transmission control stations linked to form a looped data transmission system with the intention of implementing reliable data transfer on a stand-alone basis between optional stations. The controller consists of a signal detecting circuit which detects the presence or absence of a line employment permission signal on the transmission line, a transmission control circuit which sends out a line employment permission signal in response to the absence of the line employment permission signal from another station as detected by the signal detecting circuit on condition that the first station has the loop control priority, a transmitting control circuit which responds to the detection of a line employment permission signal from a station having the loop control priority to send out transmission data together with the detected signal on condition that the station has data to be sent, a reception control circuit which receives transmission data sent through the looped data transmission system and destined to the receiving station and sends out reception data with reception acknowledgement to the sending station appended thereto, a transmission clock pulse synchronizing circuit which synchronizes the reception clock pulse to the transmission clock pulse, and a bypass circuit which removes a station from the looped data transmission line to form a by-pass of the data transmission system when the station has failed.

10 Claims, 4 Drawing Sheets

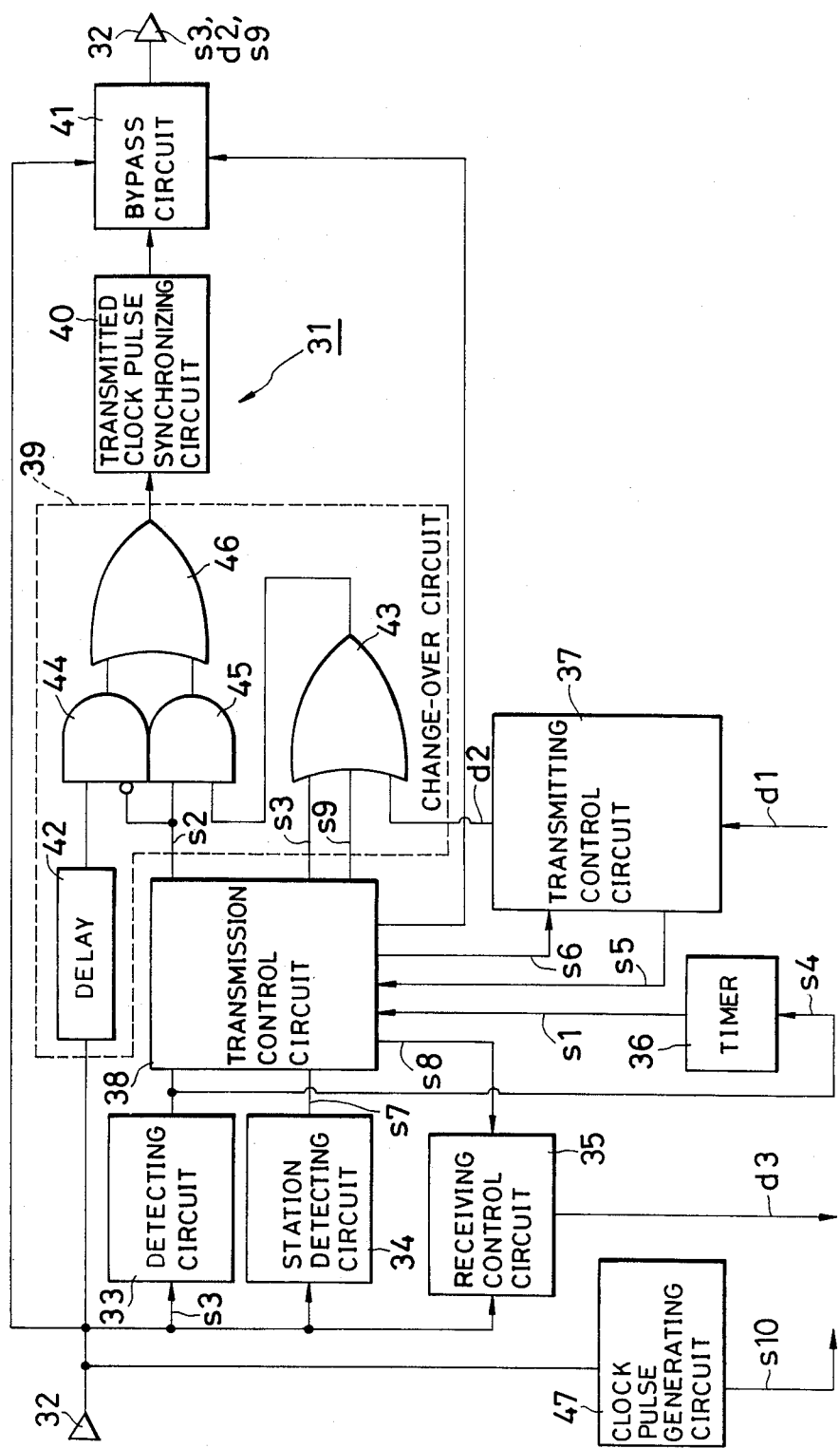

STAND-ALONE TRANSMISSION CONTROLLER

BACKGROUND OF THE INVENTION

1. Field of the Invention

The present invention relates to a stand-alone transmission controller, and particularly to a stand-alone transmission controller applicable to a stand-alone data transmission system in which transmission control stations are linked to form a loop and the data transmission control functions are distributed among the stations.

2. Description of the Prior Art

Recent data communication systems do not entirely rely on general-purpose means such as the telephone exchange network, but they now avail themselves of data exchange networks more sophisticated in all aspects of function, performance and economy. Connecting systems for making linkage between communication lines which constitute the above-mentioned data exchange networks and exchange units (exchange stations), concentrator-allotters, terminal units and the like located at the end of the lines include the exchange connection system, branch connection system, concentrator-allotter connection system, and loop connection system.

Among the various connecting systems, the loop connection system in which a high-speed transmission line connects terminal units and computers in the form of a loop is applicable to the connection between a central computer and terminal units and also to the mutual connection among arbitrary terminal units.

A conventional data transmission controller using the loop connection system is disclosed in Japanese Patent Publication No. 46-35931 (filed on Oct. 21, 1971) entitled "Method and apparatus for information transmission in a data transmission system". The system configuration by this prior art method includes, as shown in FIGS. 1 and 2, a main pulse transmitter-receiver 1 provided in the central computer, a modulator-demodulator (will be termed simply "modem" hereinafter) 2 provided in the main pulse transmitter-receiver 1 and made up of a modulator 2a and a demodulator 2b, a plurality of terminal units 4, 6, 8 and 10 located at the end of the transmission line and each made up of a switching unit 3 and a pulse transmitter-receiver 5 (7, 9, 11) connected to the switching unit 3, and terminal modems 13, 14, 15 and 16 connected in series to a transmission line 12 and each provided for a group of serially connected terminal units 4 (6, 8, 10). The terminal modem 13 (14, 15, 16) consists of a modulator 13a (14a, 15a, 16a) and a demodulator 13b (14b, 15b, 16b).

As shown in more detail in FIG. 2, the switching unit 3 consists of a pulse register 17, a decoder 18, a first terminal 19 for shunting the pulse register 17, a second terminal 20 for input connected to the pulse register 17, a third terminal 21 connected to the pulse transmitter-receiver 5 (7, 9, 11), and a switching means 22 which selects one of the first, second and third terminals 19, 20 and 21.

Next, the operation of the foregoing conventional transmission controller will be described. The closed-loop data transmission system shown in FIG. 1 has three operating modes. These are the first mode in which all switching units 3 are shunted to make the terminal lines in a blank state, the second mode in which information is transferred from the pulse transmitter-receivers 5, 7, 9 and 11 to the main pulse transmitter-receiver 1, and the third mode in which information is transferred from the main pulse transmitter-receiver 1 to the terminal pulse transmitter-receivers 5, 7, 9 and 11.

In the first mode, the switching means 22 selects the first terminal 19 for shunting in all switching units 3 in FIG. 2, and the main pulse transmitter-receiver 1 transmits a series of characters each made up of a pulse combination A. Since all switching units 3 are shorted at their input and output terminals, the output pulses from all demodulators 13b, 14b, 15b and 16b are conducted directly to the respective modulators 13a, 14a, 15a and 16a, and the flow of characters transmitted by the main pulse transmitter-receiver 1 is reproduced in each modem 13, 14, 15 and 16, and eventually it returns via the demodulator 2b to the main pulse transmitter-receiver 1. Making the character flow has two purposes. The first aim is to establish the synchronism between the oscillator in a demodulator, e.g., 14b, and the oscillator in a preceding modulator, e.g., 13a, and the second aim is to establish the synchronism between the pulse train transmitted as characters by the main pulse transmitter-receiver 1 and the pulse train detected as characters by the pulse register 17. When a character received by the pulse transmitter-receiver 1 via the demodulator 2b has the same pulse combination as a character transmitted by the pulse transmitter-receiver 1, all units in the data transmission system are proved to be synchronous.

Next, the second mode in which the main pulse transmitter-receiver 1 is ready to receive information from pulse transmitter-receivers 5, 7, 9 and 11 in the terminal units 4, 6, 8 and 10 will be described. The main pulse transmitter-receiver 1 suspends the transmission of character A and transmits two characters B and C, and thereafter resumes the transmission for character A. The purpose of transmitting the characters B and C is as follows. Once the decoder 18 has recognized character B in the pulse register 17, a pertinent pulse transmitter-receiver 5, 7, 9 or 11 having information to be sent commences the following process. ① The switching means 22 is set to select the second terminal 20; ② The pulse register contents are checked to test if the following character is C; ③ If the character is found to be C the switching means 22 is set to the third terminal 21 so that only characters transmitted from a pertinent pulse transmitter-receiver pass. Therefore, the character C is prevented from advancing to the next terminal unit 4, 6, 8 or 10 in the serial linkage, and consequently the next pulse register 17 does not receive character C immediately following the reception of character B. If a terminal unit 4, 6, 8 or 10 has no information to be sent when character B is detected by the pulse register 17, the switching means 22 stays at the vacant position. Information transmitted from any of the pulse transmitter-receivers 5, 7, 9 and 11 goes through the switching means 22 in the next unit in the serial linkage and arrives at the entry of the main pulse transmitter-receiver 1. Each of the pulse transmitter-receivers 5, 7, 9 and 11 terminates the transmission with characters B and C and resets the switching means 22 to the first terminal 19, i.e., the vacant position. Then, the above process is repeated by the next terminal unit.

Reception of characters B and C by the main pulse transmitter-receiver 1 provides the opportunity of information transmission for all pulse transmitter-receivers 5, 7, 9 and 11 in the closed loop, and this is indicated by the main pulse transmitter-receiver 1 through the transmission of character D which signifies that information sent from a low-ranking terminal unit has been received normally. If, on the other hand, information received by the main pulse transmitter-receiver 1 includes error, the above process will be retried by transmitting characters B and C again. Any pulse transmitter-receiver 5, 7, 9 or 11 having no reception of character D despite the transmission of information will send the information again.

Finally, the third mode in which the main pulse transmitter-receiver 1 is ready to send information to any of the pulse transmitter-receivers 5, 7, 9 and 11 will be described. Information transmission in this mode is implemented by transmitting two characters D and X in advance of each message. The character D signifies that the subsequent character X addresses a specific pulse transmitter-receiver intended for the message. The message goes through all switching units 3, but only a pulse transmitter-receiver with assignment of character X among pulse transmitter-receivers 5, 7, 9 and 11 will respond to the information.

However, the foregoing conventional transmission controller, in which information transmission and reception take place always via the main pulse transmitter-receiver, has a major problem that if the main pulse transmitter-receiver fails, communication among all terminal units is shut down.

Another problem is that the transmission controller implementing transmission entirely via the main pulse transmitter-receiver allows only one-to-N stations communication, and achieves a low efficiency when intended to have N-to-N stations communication.

SUMMARY OF THE INVENTION

It is an object of the present invention to provide a stand-alone transmission controller which does not necessitate a main pulse transmitter-receiver and allows mutual communication among normal stations even when any of stations has failed.

Another object of the invention is to provide a stand-alone transmission controller which basically allows N-to-N stations communication by the provision of equally capable pulse transmitter-receivers in all terminal units on the serial transmission line.

In order to achieve the above objectives, the inventive stand-alone transmission controller is capable of N-to-N stations communication by the provision for each station, located at the end of a transmission line in a series-connected data transmission system, of a data transmission function which checks the condition of the transmission line and, if any line employment permission signal is not present on the line, transmits a line employment permission signal, and, if a fault should occur in one of the stations, specifies a destination address so that transmission proceeds by by-passing the that station.

BRIEF DESCRIPTION OF THE DRAWINGS

FIG. 4 is a block diagram showing in detail the transmission controller constituting each transmission control station in FIG. 3.

DESCRIPTION OF THE PREFERRED EMBODIMENT

A preferred embodiment of the present invention will now be described with reference to the drawings.

Figure 1:
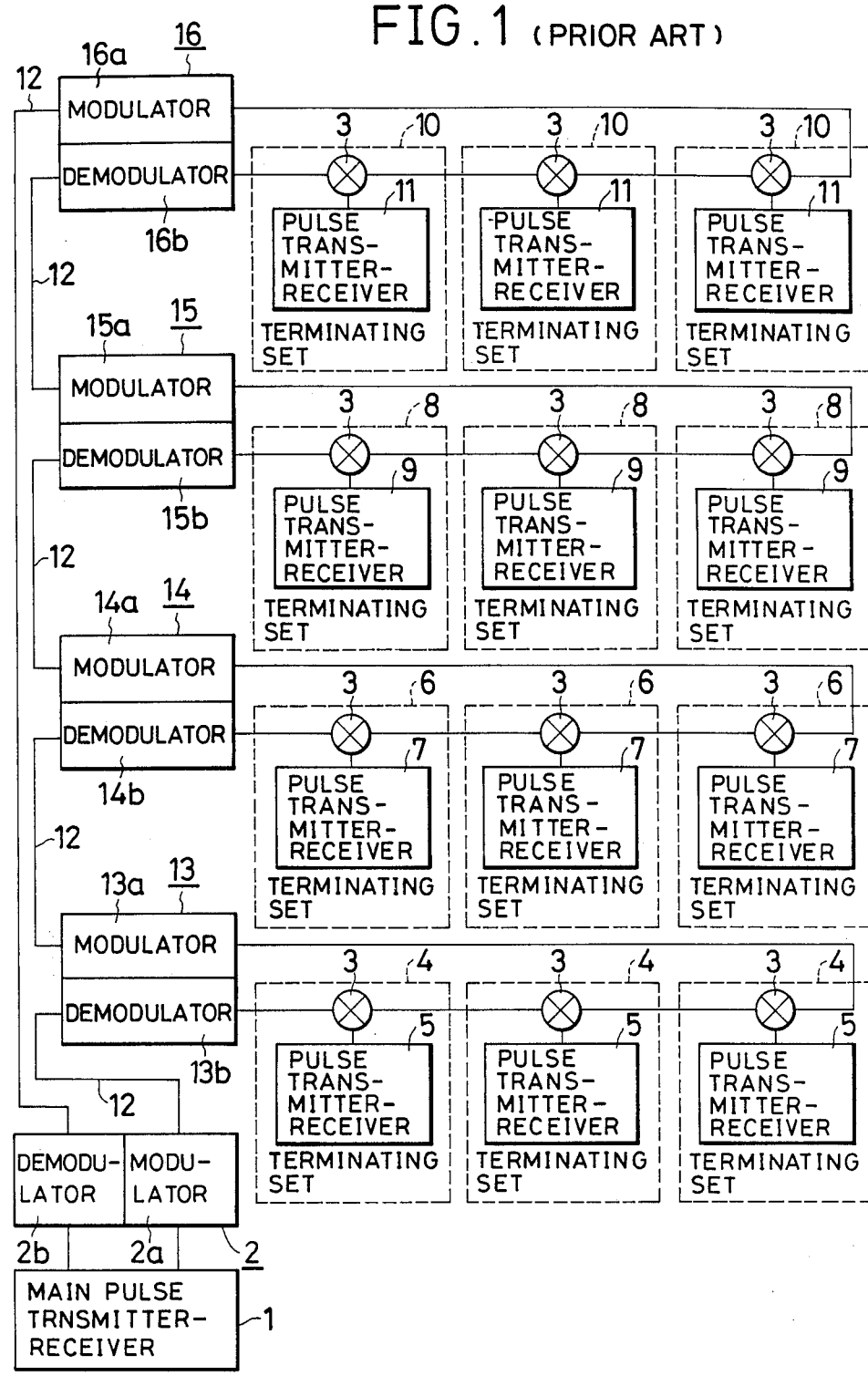
FIG. 1 is a block diagram showing a conventional transmission controller used in a looped transmission system.
Figure 2:
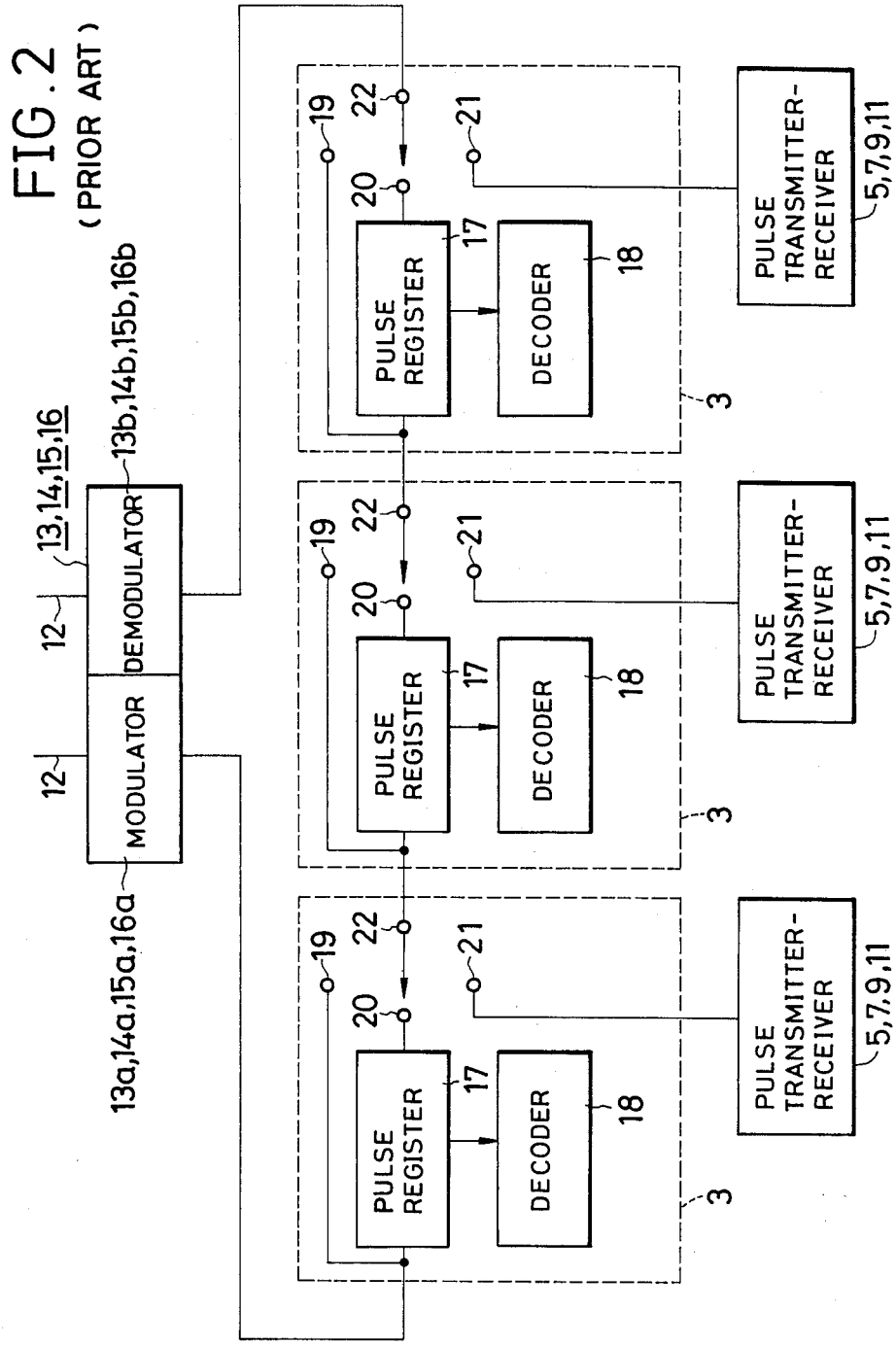
FIG. 2 is a block diagram showing in detail the switching unit in the transmission controller of FIG. 1.
Figure 3:
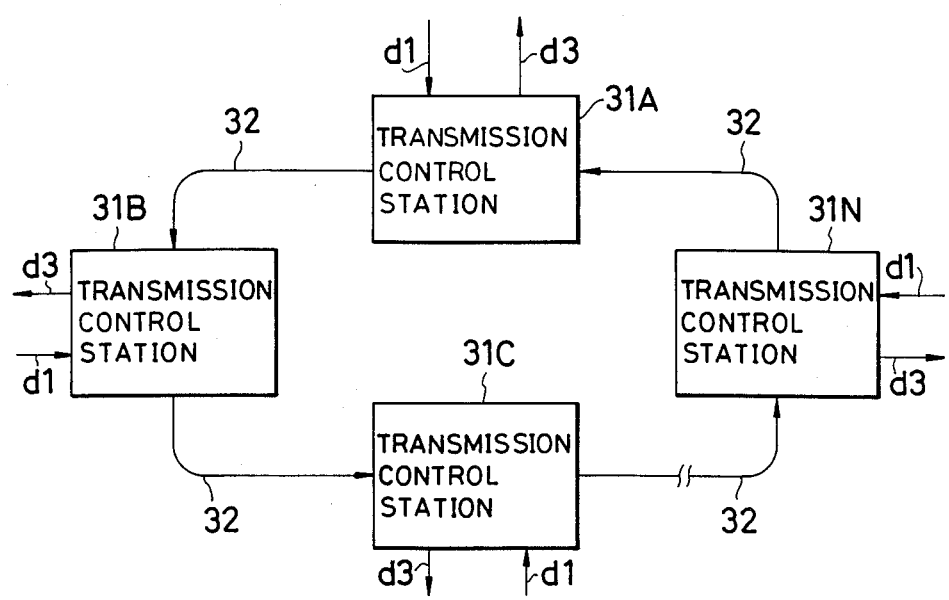
FIG. 3 is a block diagram of the stand-alone transmission controller used in a looped transmission system embodying the present invention.

FIG. 3 shows the looped transmission system pertinent to this invention, in which transmission control stations 31 are linked through a transmission line 32. The transmission control stations 31 are placed in any number as shown by 31A, 31B, 31C, ..., 31N along the transmission system.

Each transmission control station 31, as shown in FIG. 4, consists of a circuit 33 for detecting the line employment permission signal, a circuit 34 for detecting whether or not data flowing on the transmission line 32 is destined for that station, a receiving control circuit 35 for extracting relevant data among the data flow on the transmission line 32, a timer 36 for monitoring the presence or absence of the line employment permission signal on the transmission line 32, a transmitting control circuit 37 for sending out transmission data, a transmission control circuit 38 which receives the line employment permission signal from the detecting circuit 33 and sends out data over the transmission line 32 when the transmitting control circuit 37 has then transmission data and further sends out a line employment permission signal over the transmission line 32 in response to the operaton of the timer 36, a change-over circuit 39 which opens the transmission line 32 to insert the control signal and data, a transmitted clock synchronizing circuit 40 which synchronizes the sending control signal and data to the clock of the station, and bypass circuit 41 which causes the transmission line 32 to by-pass the a station when it fails.

The change-over circuit 39 consists of a bit delay circuit 42, an OR gate 43 which receives the outputs of the transmitting control circuit 37 and transmission control circuit 38 and produces a logical-sum output, an AND gate 44 which receives the outputs of the bit delay circuit 42 and the transmission control circuit 38 to produce a logical-product output, an AND gate 45 which receives the outputs of the OR gate 43 and transmission control circuit 38 to produce a logical-product output, and an OR gate 46 which receives the outputs of the AND gates 44 and 45 to provide a logical-sum output to the transmitted clock pulse synchronizing circuit 40. Reference number 47 denotes a clock pulse generating circuit.

The operation of the foregoing transmission controller will be described.

When the transmission control stations 31A-31N are turned on, at which time no special command flows on the transmission line 32, the timer 36 in each station starts operating. On expiration of the timer 36 in one station having a shortest setup time, the timer output signal s1 is sent forth to the transmission control circuit 38, which then produces a line insertion signal s2 and line employment permission signal s3, and the signal s3 is sent out over the transmission line 32.

In the meantime, another station detects the line employment permission signal s3 by its detecting circuit 33 and sends out a reset signal s4 to the timer 36. Then, the timer 36 is reset to a standby state. The station which has transmitted the line employment permission signal s3 receives the return signal s3 and sends it again, and the stations repeat these operations until the other station makes data transmission.

When an arbitrary station generates transmission data d1, a transmission data presence signal s5 based on the data d1 entered in the transmitting control circuit 37 is issued to the transmission control circuit 38. Upon receiving the output signal s1 of the timer 36 caused by the reset signal s4 which is based on the line employment permission signal s3 detected by the detecting circuit 33, the transmission control circuit 38 produces a line insertion signal s2 and sends out a transmission initiation signal s6 to the transmitting control circuit 37, which then provides transmission data d2 including a destination address to the change-over circuit 39. Data transmission is thus carried out.

Now a receiving station detects the matching of address by its detecting circuit 34, and issues an address-match signal s7 to the transmission control circuit 38. The transmission control circuit 38 issues a reception initiation signal s8 to the receiving control circuit 35, which then gets the reception data d3. The transmission control circuit 38 sends out a reception acknowledge signal s9 together with the line insertion signal s2 over the transmission line 32, and terminates the receiving operation. Upon receiving the reception acknowledge signal s9, the sending station also terminates the transmitting operation, and sends out a line employment permission signal s3 over the line 32 in the same procedure as at the expiration of the timer 36 in the system start-up phase (see FIG. 5).

Figure 5:
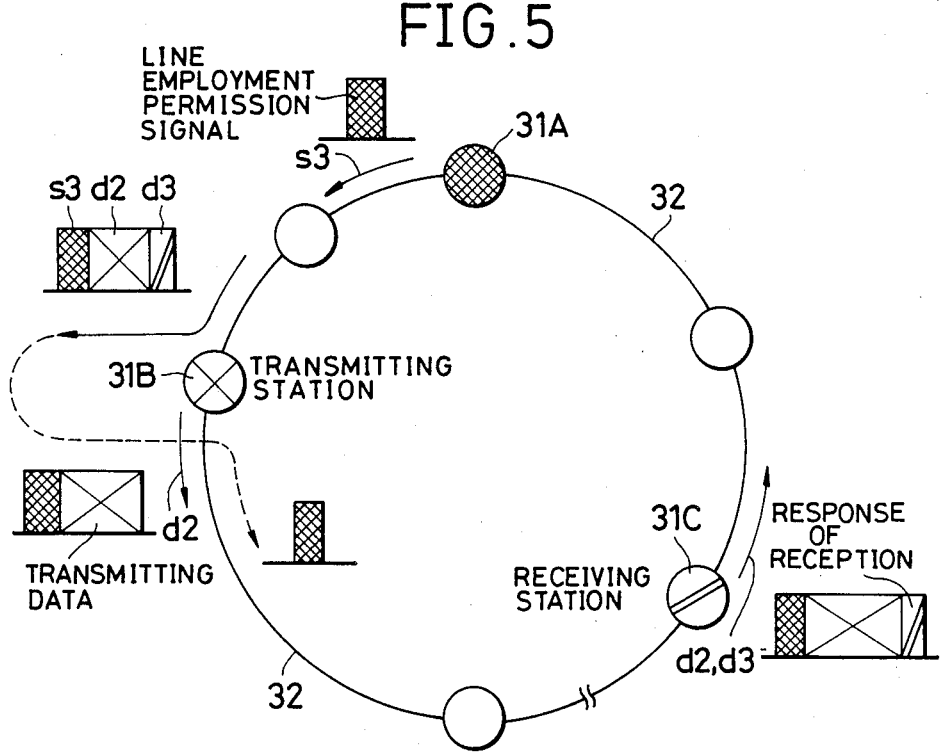
FIG. 5 is a diagram used to explain the basic operation of the N-to-N stations communication in the looped transmission system in which each station is equipped with the stand-alone transmission controller shown in FIGS. 3 and 4.

The basic operation of N-to-N stations communication in FIG. 5 is summarized as follows. Initially, when a transmission control station 31A having the loop control priority sends out a line employment permission signal s3, another transmission control station (will be termed "sending station" hereinafter) 31B with the data transmission request detects the incoming signal and, if it is found to be the line employment permission signal s3, sends out transmission data d2 including a sending address with the signal s3. A transmission control station 31C which meets the sending mode address of the transmission data d2 accompanied by the signal s3 operates as a data receiving station to take the transmission data d2, and it appends a receiving response data d3 as reception acknowledgement to the data d2 and sends data d2, d3 back to the sending station 31B. The sending station 31B receives the receiving data d3 indicative of reception acknowledgement to find the normal reception by the receiving station 31C, and it now has the loop control priority and sends out a line employment permission signal s3. This is followed by the same operation carried out previously by the transmission control station 31A.

According to the inventive transmission controller, as described above, the instruction character sending function is not concentrated on the main pulse transmitter-receiver in sending out the line employment permission signal s3 onto the transmission line 32, but instead it is distributed among transmission control stations. If by some reason a transmission control station fails during the transmission of the line employment permission signal, the defective station is removed from the transmission line by the by-pass circuit 41, and the interruption of the line employment permission signal s3 causes a temporary failure of communication. But in a short while, the operation similar to that of the system start-up phase will resume, and a transmission control station 31 having a shortest setup time for the timer 36 issues a line employment permission signal s3 in response to the expiration of the timer 36, and then the normal communication will resume immediately.

The clock pulse generating circuit 47 is to produce a basic timing signal s10 for operating circuits except the transmission clock pulse synchronizing circuit 40, and the circuit 40 is to synchronize various signals on the reception clock with the sending clock.

Although in the above embodiment the change-over circuit 39 as a means of data insertion to the transmission line is configured by combination of various gates including logical-sum and logical-product, the present invention is not confined to this arrangement, but switching devices such as analog switches may be used.

As described above in detail, the inventive stand-alone transmission controller used in a looped data transmission system eliminates a master station equipped with a main pulse transmitter-receiver and the like and allows all stations to have mutual communication on a stand-alone basis, which prevents the system from total shut down in the event of a failure in any station, whereby enhanced system reliability is achieved.

The data transmission function is added by the ability of specifying a data destination address, and the stand-alone transmission controller is basically capable of N-to-N stations transmission.

What is claimed is:

1. A stand-alone transmisson controller comprising a plurality of transmission-reception stations linked in the form of a loop through a transmission line, and intended to have data transmission between voluntary ones of said stations, each of said transmission-reception stations comprising:

signal detecting means for detecting the presence or absence of a line employment permission signal on said transmission line;

transmission control means which sends out said line employment permission signal from one of said stations into said looped data transmission system on condition that said signal detecting means of said one station has detected the absence of said line employment permission signal from another station on said transmission line and that said one station has loop control priority;

transmitting control means which sends transmission data through said loop to a receiving station on condition that said signal detecting means of the sending station has detected said line employment permission signal produced by said transmission control means of said station having the loop control priority;

reception control means which takes said transmission data addressed to said receiving station, as detected by said signal detecting means, into said receiving station and sends out a reception acknowledge signal into said loop;

transmission clock pulse synchronizing means which sends out a signal from a sending station to a receiving station, said signal being received by said receiving station through a data insertion switching means for connection to said transmission line, in synchronism with the clock pulse of said one station when said one station sends a signal to said looped data transmission system;

said transmission control means issuing a line employment permission signal, a line insertion signal and a reception acknowledgement signal to said data insertion switching means following reception of transmission data when the station is a receiving station; and by-pass means which forms a by-pass by removing a station from said looped transmission system when that station has failed.

2. A stand-alone transmission controller according to claim 1, wherein said signal detecting means comprises a signal detecting circuit for detecting the presence or absence of said line employment permission signal sent from a sending station into said loop, and a station addressing signal detecting circuit which detects an address signal for said receiving station in said transmission data sent with said line employment permission signal from said sending station and transmits to said sending station a signal acknowledging reception of data by said receiving station.

3. A stand-alone transmission controller according to claim 1, wherein said transmission control means comprises a transmission control circuit which sends out said line employment permission signal at the startup of said looped data transmission system or immediately after the occurrence of a fault in any of said stations on condition that the station sending said line employment permission signal has the loop control priority, or sends to said transmitting control means a transmission initiating signal for causing said transmitting control means to send transmission data including a destination address onto said transmission line based on a transmission data presence signal from said transmitting control means and said line employment permission signal detected by said signal detecting means.

4. A stand-alone transmission controller according to claim 3, wherein said transmission control means sends out said line employment permission signal based on a time expiration signal of a timer circuit which starts operating in response to an output signal produced by said signal detecting means upon detection of said line employment permission signal on said transmission line.

5. A stand-alone transmission controller according to claim 4, wherein said timer circuit, in case it is provided in a station other than said station having the loop control priority, is reset to a standby mode by an output signal produced by said signal detecting means based on said line employment permission signal detected by said signal detecting means.

6. A stand-alone transmission controller according to claim 1, wherein each station further comprises a timer set with a specific setup time such that said line employment permission signal is output by the station having the shortest setup time.

7. A stand-alone transmission controller according to claim 1, wherein data insertion switching means comprises a digital switching circuit including a delay circuit which directly receives from said transmission line said line employment permission signal from another station, a first AND gate which receives the output of said delay circuit and produces an output signal in response to the absence of said line employment permission signal from said transmission control means, a first OR gate which produces an output signal in response to any of said line insertion signal, said reception acknowledgement signal and a transmission data signal from said transmitting control means, a second AND gate which produces an output signal in response to the concurrent reception of the output of said first OR gate and said line employment permission signal from said transmission control means, and a second OR gate which produces an output signal in response to the reception of any of the outputs from said first AND gate and said second AND gate.

8. A stand-alone transmission controller according to claim 1, wherein said data insertion switching means comprises an analog switching circuit made up in combination of analog switching devices which sequentially switch said line employment permission signal, said line insertion signal and said reception acknowledgement signal provided by said transmission control means and said transmission data signal provided by said transmitting control means.

9. A stand-alone transmission controller according to claim 1, wherein said transmission clock pulse synchronizing means comprises a synchronizing circuit which, during the operation of receiving various signals sent from said another station and sending said signals from the said one station to said looped data transmission system, synchronizes reception clock pulses with sending clock pulses.

10. A stand-along transmission controller according to claim 1 wherein each of said stations further includes a clock pulse generating means and wherein electrical circuits constituting said signal detecting means, said transmission control means, said transmitting control means, said reception control means and said by-pass means are designed to operate by being timed basically by clock pulses provided by said clock pulse generating means.

* * * * *

UNITED STATES PATENT AND TRADEMARK OFFICE
CERTIFICATE OF CORRECTION

PATENT NO. : 4,855,998

DATED : August 8, 1989

INVENTOR(S) : KAZUO KISHIMOTO.

It is certified that error appears in the above-identified patent and that said Letters Patent is hereby corrected as shown below:

Col. 3, line 54, delete "the".

Col. 4, line 39, delete "the".

Col. 6, line 31, "transmisson" should be --transmission--.

Signed and Sealed this

Twentieth Day of November, 1990

Attest:

*Attesting Officer*

HARRY F. MANBECK, JR.

*Commissioner of Patents and Trademarks*